United States Patent [19]

Burton

[11] Patent Number: 4,953,397

[45] Date of Patent: Sep. 4, 1990

[54] CONTINUOUS FLOW HYPERSONIC CENTRIFUGAL WIND TUNNEL

[75] Inventor: Robert L. Burton, Salem, Va.

[73] Assignee: The Boeing Company, Seattle, Wash.

[21] Appl. No.: 384,638

[22] Filed: Jul. 25, 1989

[51] Int. Cl.$^5$ .............................................. G01M 9/00
[52] U.S. Cl. ...................................................... 73/147
[58] Field of Search .......................................... 73/147

[56] References Cited

U.S. PATENT DOCUMENTS

| 1,811,364 | 6/1931 | Olshevsky | 73/147 |
| 2,152,317 | 3/1939 | Kramer | 73/147 |
| 2,992,557 | 7/1961 | Bosse | 73/147 |
| 3,276,252 | 10/1966 | Shapiro | 73/147 |

FOREIGN PATENT DOCUMENTS 567367  5/1982  U.S.S.R. .

Primary Examiner—Donald O. Woodiel
Attorney, Agent, or Firm—Finnegan, Henderson, Farabow, Garrett & Dunner

[57] ABSTRACT

A wind tunnel for testing aerodynamic surfaces, comprising a rotor defining a cylindrical cavity for circulating a gas around the periphery of the cavity, first and second elements each having inner and outer surfaces extending between a nozzle end and an exhaust end of the wind tunnel, the elements being mounted in opposed relation in the cavity, the inner surfaces of the elements cooperating to define a nozzle, a test region and an exhaust region, the scoop surface disposed proximate the nozzle for diverting a predetermined portion of circulating gas through the nozzle, test region, and exhaust region, the exhaust region being open to the cavity to permit the diverted gas to rejoin the circulating gas, and a sting for mounting the aerodynamic surface in the test region.

17 Claims, 5 Drawing Sheets

CONTINUOUS FLOW HYPERSONIC CENTRIFUGAL WIND TUNNEL

BACKGROUND OF THE INVENTION

1. Field of The Invention

This invention relates to a hypersonic wind tunnel used to test the aerodynamic properties of various surfaces.

2. Description of The Related Art

Various wind tunnels have been constructed in order to test aerodynamic surfaces at hypersonic speeds. In continuous flow supersonic tunnels, air is recirculated around a loop containing a large compressor, a heat exchanger, a converging-diverging inlet nozzle, a test section, and an outlet con-di diffuser. An inherent problem with such devices is that the compressor and heat exchanger require excessive power to compensate for velocity drag losses from shock waves and boundary layers. The power required by the compressor and heat exchanger may be on the order of hundreds of mega watts just to maintain test section mach numbers of less than 10.

Another known wind tunnel is the intermittent supersonic tunnel in which high or low pressure is provided on one side of the test section causing a surge of gas through the test section. In a shock tube driven wind tunnel high pressure gas is released into a low pressure section and the resulting gas flow is directed through a test section to the atmosphere. An atmospheric inlet wind tunnel has atmosphere pressure on one side of the test section and a vacuum on the other side; the vacuum pulls gas through the test section. In a blow down wind tunnel a high pressure gas in a storage tank is released for passage through a test section and then to the atmosphere.

An inherent problem with intermittent supersonic tunnels is that hypersonic mach numbers can only be achieved for very short test periods (order of seconds). In addition, these tunnels generally are incapable of achieving high mach numbers.

The instant invention has overcome many of the disadvantages of the prior art by providing an improved method of and a hypersonic wind tunnel for testing aerodynamic surfaces.

SUMMARY OF THE INVENTION

The objects and advantages of the invention may be realized and attained by means of the instrumentalities and combinations particularly pointed out in the appended claims.

In accordance with the invention, as embodied and broadly described herein, the wind tunnel of the invention comprises rotor means defining a cylindrical cavity for circulating a gas around the periphery of said cavity, first and second elements each having inner and outer surfaces extending between a nozzle end and an exhaust end, said elements being mounted in opposed relation in said cavity, the inner surfaces of said elements cooperating to define a nozzle, a test region and an exhaust region, said wind tunnel also including means disposed proximate to said nozzle for diverting a predetermined portion of said circulating gas through said nozzle, test region, and exhaust region, the exhaust region being open to said cavity to permit the diverted gas to rejoin the circulating gas and means for mounting said aerodynamic surface in said test region.

The invention further includes a method for aerodynamically testing a surface comprising the steps of continuously circulating a gas about the interior periphery of the closed-loop, diverting a portion of the circulating gas through the test region, and returning the diverted gas to the periphery of the closed-loop.

BRIEF DESCRIPTION OF THE DRAWINGS

The accompanying drawings which are incorporated in and constitute a part of the specification, illustrate embodiments of the invention, and together with the description serve to explain the principals of the invention.

DESCRIPTION OF THE PREFERRED EMBODIMENT

Reference will now be made in detail to the preferred embodiments of the invention, examples of which are illustrated in the accompanying drawings.

Figure 2:
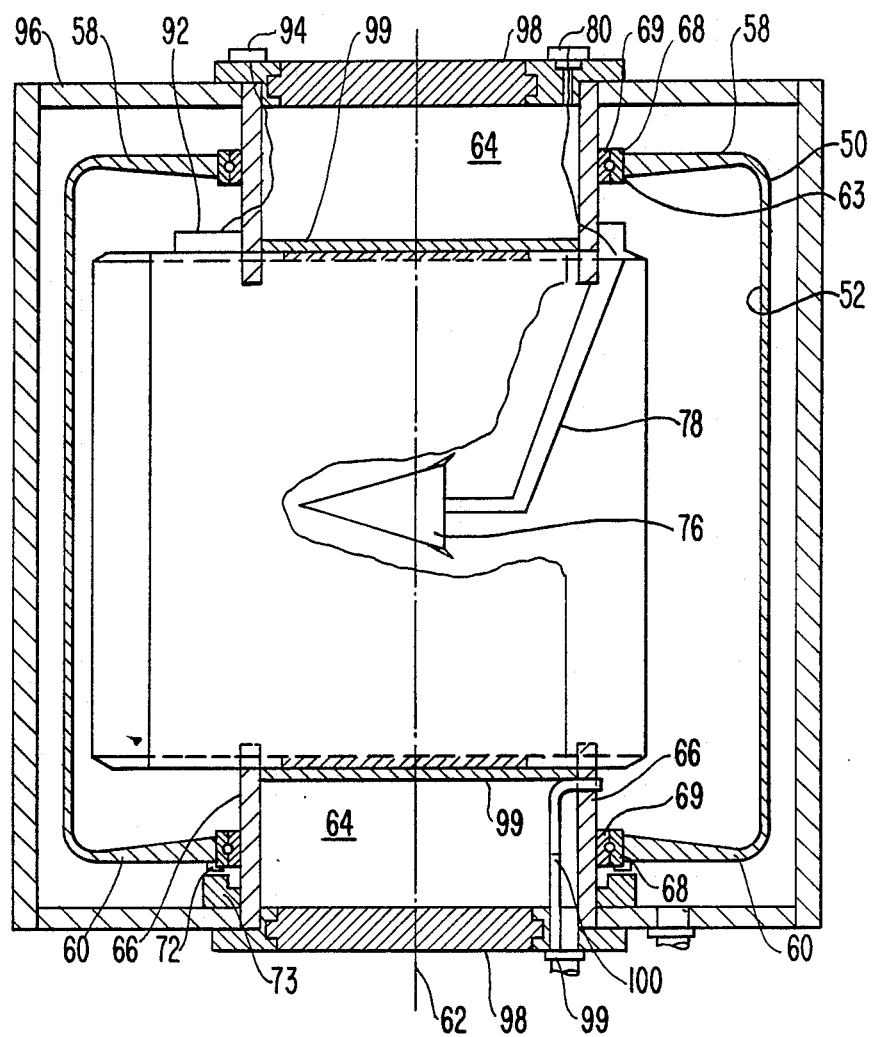
FIG. 2 is a cross-sectional top elevation of the wind tunnel of FIG. 1.
Figure 3:
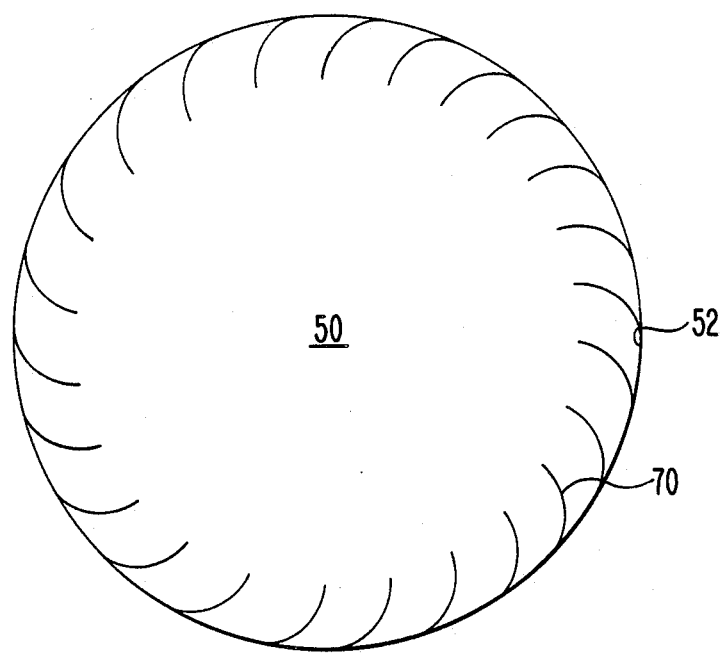
FIG. 3 is a cross-sectional side view of a rotor in accordance with a second embodiment of the present invention.

In accordance with the invention, the wind tunnel comprises rotor means defining a cylindrical cavity for circulating a gas around the periphery of said cavity. As embodied herein, the rotor means comprises rotor 50 having cylindrical inner wall 52 rotatable about central axis 62. As depicted in FIG. 3, inner wall 52 of rotor 50 may include inwardly projecting fins 70 to aid in gas circulation. Rotor 50 may be constructed of various metals or composites depending upon design wall speed requirements and gas temperatures. In a preferred embodiment and as depicted in FIG. 2, the wind tunnel is provided with exterior casing 96 that surrounds and encloses rotor 50. Casing 96 includes cylindrical core 66 disposed coaxially with the axis of rotor 50. Preferably, at least one view port is disposed in an end of cylindrical core 66 to allow viewing of test region 74. The view port comprises two windows 98 and 99 fixed in circular opening 64 defined by core 66. Windows 99 also serve to prevent gas from passing into circular openings 64. Casing 96 preferably is a vacuum enclosure capable of maintaining a vacuum of approximately $10^{-4}$ Torr. This nearly eliminates aerodynamic drag on the outside of rotor 50. Casing 96 also forms a crash containment structure in the event of rotor failure.

Rotor 50 may include side walls 58, 60 disposed on either end of rotor 50 perpendicular to and integrally formed with cylindrical inner wall 52. Each side wall 58, 60 includes a circular opening 63 coaxial with core 66. Rotor 50 is supported for rotation by core 66. Complementary bearing tracks 68, 69 are fixed to the peripheries of openings 63 and the outside wall of core 66, respectively, to permit rotor 50 to rotate about core 66. Rotor 50 may be rotatably supported by other means such as a non-contacting magnetic suspension system.

Preferably, the rotor means includes a motor drive system for rotating the rotor about a central axis. By way of example and not limitation, the motor drive system may be a permanent magnet motor drive system. The magnet motor is similar to those known in the industry except that armature magnets 72 and stator 73 are sized slightly larger than the diameter of columns 66.

Figure 1:
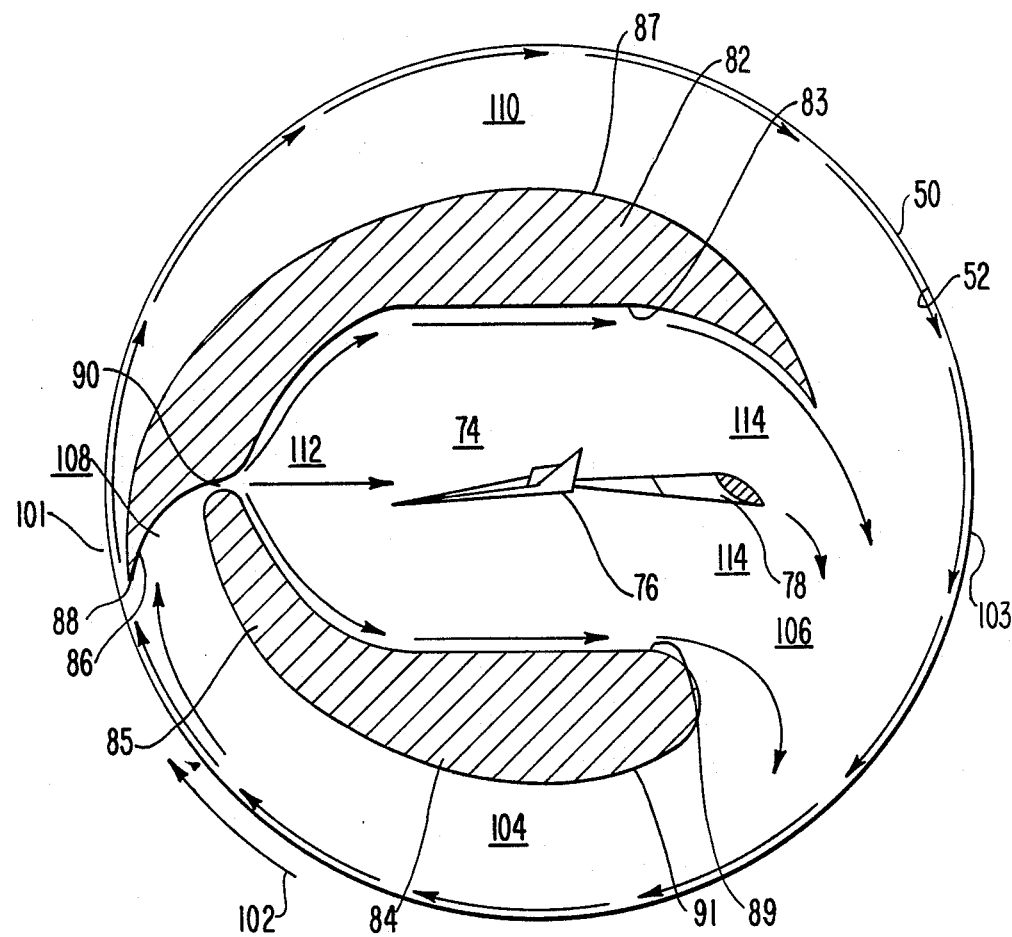
FIG. 1 is a cross-sectional side elevation of the wind tunnel in accordance with the present invention.

In accordance with the present invention, the wind tunnel includes first and second elements each having inner and outer surfaces extending between a nozzle end and an exhaust end, said elements being mounted in opposed relation in said cavity, the inner surfaces of said elements cooperating to define a nozzle, a test region and an exhaust region. Preferably, as depicted in FIG. 1, first element 82 and second element 84 each have inner surfaces 83, 89, respectively, and outer surfaces 87, 91, respectively. The surfaces of each element 82, 84 extend between nozzle end 101 and exhaust end 103 of the wind tunnel. Elements 82, 84 are disposed in the cavity defined by rotor 50 in opposed relation to define a nozzle 90, test region 74 and exhaust region 114 between their respective inner surfaces. The exhaust region is open to the rotor cavity to permit gas to rejoin circulating gas at the periphery of rotor 50.

In accordance with the invention, the wind tunnel comprises means disposed proximate said nozzle for diverting a predetermined portion of said circulating gas through said nozzle, test region, and exhaust region, the exhaust region being open to said cavity to permit the diverted gas to rejoin the circulating gas. As depicted in FIG. 1, the diverting means comprises scoop surface 86 having a sharp tip 88 integrally formed at the nozzle end of first element 82. Tip 88 extends towards inner wall 52 of rotor 50 for diverting a portion of the circulating gas through nozzle 90 and into test region 74. Preferably, scoop surface 86 cooperates with a portion of outer surface 91 of second element 84 to define an inlet region 108 for directing gas into nozzle 90.

The test region is disposed between first element 82 and second element 84 and is located at the center of rotor 50. Central axis 62 extends through the center of test region 74. Test model 76 is suspended within test region 74, on a conventional wind tunnel sting 78. A conventional model manipulator control 80 is connected to sting 78 for manipulating model 76 during testing.

By way of example and not limitation, the test section of the wind tunnel may measure 0.6 m×0.8 m×1.4 m. The test section enclosure formed by the inner surfaces 83, 89 of the first and second elements 82, 84 serves as a crash enclosure to help protect expensive models in the event of a rotor failure. Prior test experience has shown that, with proper design, rotor integrity can be maintained indefinitely at design conditions.

The outer surface 87 of first element 82 is spaced from wall 52 of rotor 50 to define a bypass region 110 for permitting continued circulation of gas not diverted by scoop surface 86. The exhaust ends of elements 82, 84 are spaced from wall 52 and define a mixing region 106 in which diverted gas rejoins circulating gas. Outer surface 91 of second element 84 is spaced from wall 52 to define freestream recovery region to permit gas exiting the mixing region to achieve freestream gradients prior to reaching inlet 90.

Preferably, first element 82 and second element 84 are mounted on core 66 for movement about axes parallel to central axis 62. Each element is movable relative to the other to selectively control the amount of gas passing through inlet 90, to vary to size of nozzle and to further adjust gas flow patterns within the wind tunnel. By way of example and not limitation, elements 82 and 84 may be movable using a servo system 92 with motors on a lead type mechanism. The servo system may be controlled using exterior control panel 94 mounted on exterior casing 96. This design allows control of each element's position to allow variable control of the nozzle throat width. The points of motion control (denoted by two sets of directional arrows 120 and 122 in FIG. 4) are equidistant from the center of the nozzle throat. Therefore, rotation about the control points would open or close the nozzle throat. Finely-controlled and smooth movement of elements 82, 84 may permit active control of mach numbers during test conditions.

In a preferred embodiment, the wind tunnel includes gas feed and withdrawal means for supplying controlled quantities of selected gases to said circulating gas. As embodied herein, gas feed and withdrawal means comprises gas line port 99 extending through exterior casing 96, and gas line 100. Gas line 100 connects port 99 with the area within rotor 50 for supplying various gases to the circulating gas. Since the molecular weight of atmospheric gases decreases with altitude, gas line 100 may be used to simulate changes of altitude by supplying gases with lower molecular weights.

In accordance with the invention, the wind tunnel comprises means for mounting said aerodynamic surface in said test region. As embodied herein, the mounting means comprises conventional wind tunnel sting 78. Using model manipulator control 80, sting 78 can be manipulated to vary the position of test surface 76 during the testing process.

Figure 5:
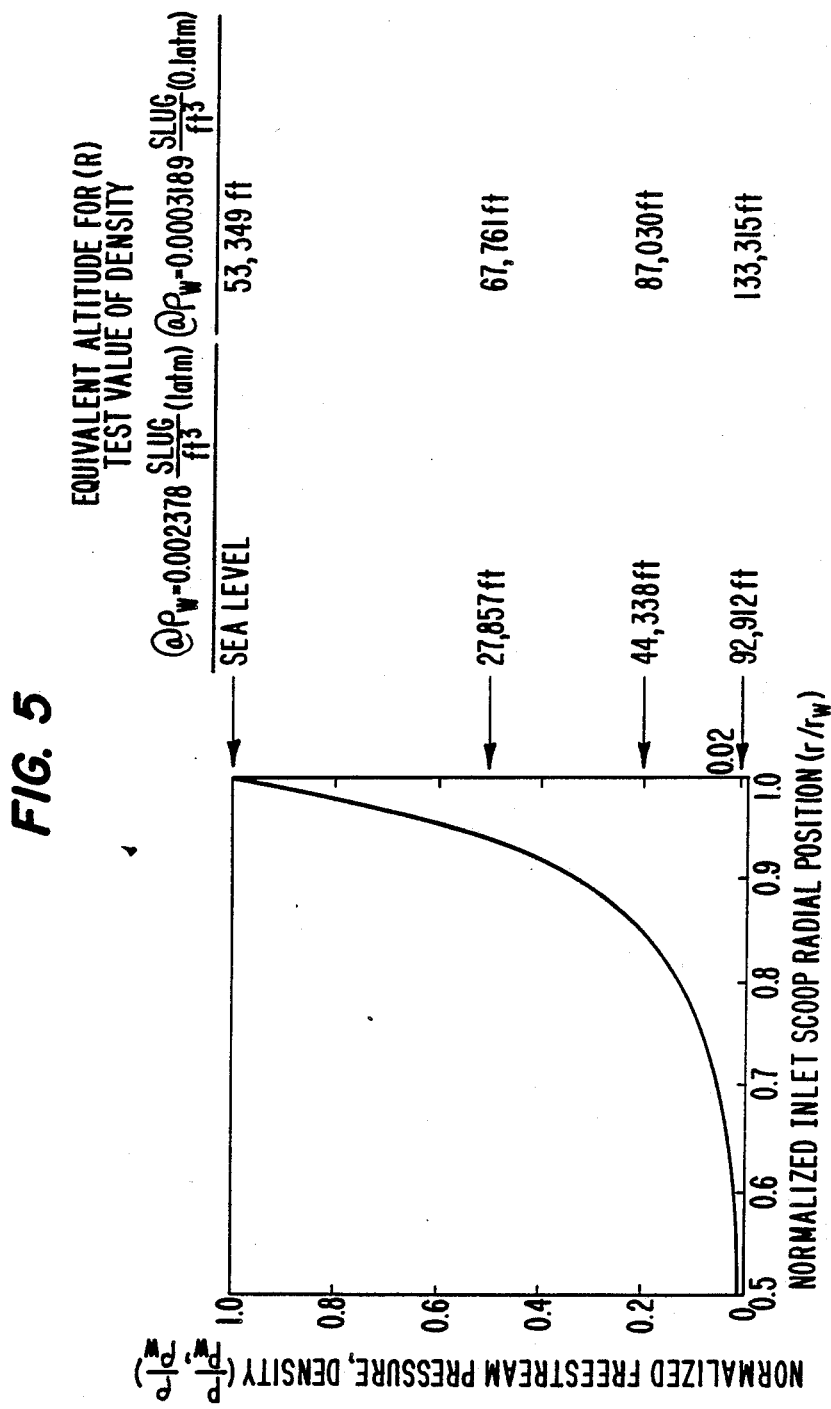
FIG. 5 is a graph depicting the relationship between the radial position of the scoop surface and freestream pressure density in accordance with a preferred embodiment of the present invention.

Referring to FIG. 1, operation of the wind tunnel will now be described. After model 76 is placed in test region 74, rotor 50 is rotated in a clockwise direction as represented by arrow 102 Rotation of rotor 50 causes gas to begin flowing through free stream recovery region 104 between element 84 and wall 52. Freestream recovery region 104 is designed to be of sufficient length to allow smooth compression and re-acceleration of the gas after passage through turbulent mixing region 106. The compressed gas is then split by scoop surface 86 with a portion being ingested through inlet region 108 and the remainder flowing into bypass region 110 located between wall 52 and element 82. The amount of ingested gas into inlet region 108 is controlled by the radial position of sharp tip 88 of scoop surface 86. For example, a rotor with a radius of 1 meter operating at a spin frequency of 159.16 rev/sec would have a tangential wall gas velocity of 1000 m/s ($V_w = 2\pi r_w f$). At a wall gas pressure of 1 atmosphere for air and a wall temperature of 300 K., the freestream density profile shown in FIG. 5 would be expected. The ideal pressure profile would follow the same exponential curve. For a scoop tip positioned at 0.975 of the wall radius ($r/r_w = 0.975$), integration of the mass flowrate across the scoop opening will show that about 75 kilograms/sec mass flowrate will enter the inlet. This value varies as a function of the gas wall pressure as well as the position of the scoop. In ideal conditions, 75% of the gas is ingested through inlet region 108, and 25% flows into bypass region 110. In these conditions, the maximum flow rate is 100 kg/s. Note that the above calculations are defined on the basis of 1 meter inlet height. Bypass region 110 is also pumped by rotor 50 and forms a long cylindrical nozzle. This accelerates the bypass gas flow and cools the gas. Ideally, the bypass gas will reach the design temperature of 300 K. at the wall layer. This cool gas layer tends to protect the rotating wall from high heating effects in mixing region 106. The bypass gas layer is supersonic entering the mixing region (Mach number > 2.88 for design conditions). This allows much easier mixing with the diffuser exhaust gas than for most tunnels (i.e., easier than exhausting to a static ambient atmosphere). The dimensions of bypass region 110 is designed to sufficiently accelerate and cool the bypassing gas.

Figure 4:
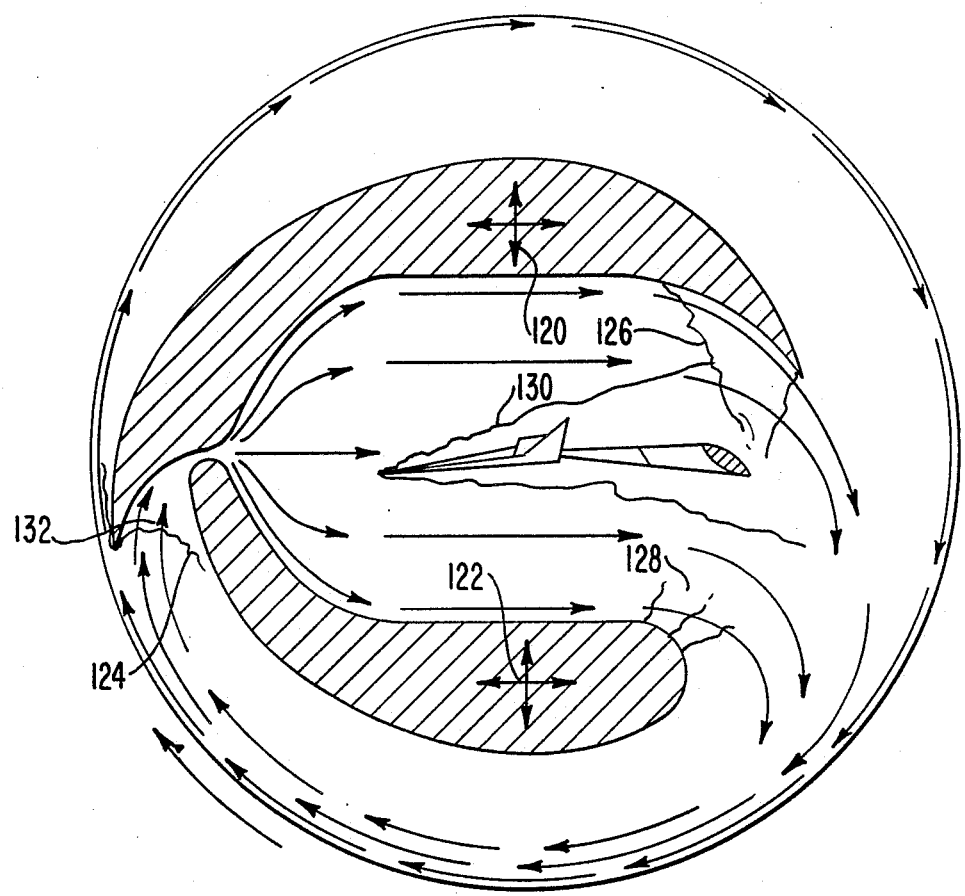
FIG. 4 is a cross-sectional schematic diagram of gas flow patterns in the wind tunnel of FIG. 1.

Gas flow through inlet region 108 is diffused by nozzle 90 located between the nozzle ends of elements 82, 84. As shown in FIG. 4, inlet region gas flow 132 passes through an inlet shock 124 emanating from the scoop tip. This shock is formed as a Prandtl-Meyer compression wave which is smeared because of the density/pressure gradient. Finite-difference Navier-Stokes solutions in the inlet region indicate that the shock form is similar to shock forms 126, 128 and 130 depicted in FIG. 4. The shock heats the inlet gas and slows and compresses the gas into the converging-diverging nozzle region 112. The gas is smoothly expanded through a Mach 10 nozzle into the test region 74. The relative positions of cam surfaces 82 and 84 can be adjusted using exterior control panel 94 to open or close the nozzle throat. Gas flowing through test region 74 flows over model 76 and into exhaust region 114.

Gas flow patterns can be observed through view windows 98 and 99 located in openings 64 of columns 66. Using model manipulator control 80, the position of test surface 76 can be varied during the testing process.

Gas from exhaust region 114 mixes with gas from bypass region 110 in mixing region 106 before reentering freestream recovery region 104.

The controlling functions for test section Mach numbers are basically related to the diameter of the rotor. Calculations indicate that a rotor of 6.5 meter diameter would allow A/A* ratios sufficient to achieve test section Mach number of 25. Note that the scoop tip position would remain the same for larger diameter rotors and the additional volume would occur in the bypass 110, mixing 106 and freestream recovery 104 regions. These added volumes would compensate for the greater mixing area required, the longer freestream recovery lengths required and the greater bypass expansion cooling required for the higher Mach number exit flow.

Additional advantages and modifications will readilty occur to those skilled in the art. The invention in its broader aspects is therefore, not limited to the specific details, representative apparatus and illustrative example shown and described. Accordingly, departures may be made from such details without departing from the spirit or scope of the general inventive concept as defined by the appended claims and their equivalents.

What is claimed is:

1. A wind tunnel for testing an aerodynamic surface, said tunnel comprising:
   rotor means defining a cylindrical cavity for circulating a gas around the periphery of said cavity;
   first and second elements each having inner and outer surfaces extending between a nozzle end and an exhaust end of said wind tunnel, said elements being mounted in opposed relation in said cavity, the inner surfaces of said elements cooperating to define a nozzle, a test region and an exhaust region;
   means disposed proximate said nozzle for diverting a predetermined portion of said circulating gas through said nozzle, test region, and exhaust region, the exhaust region being open to said cavity to permit the diverted gas to rejoin the circulating gas; and
   means for mounting said aerodynamic surface in said test region.

2. The wind tunnel of claim 1, wherein said diverting means is a scoop surface integral with the nozzle end of said first element disposed to cooperate with a portion of the outer surface of said second element at the nozzle end thereof to define an inlet region.

3. The wind tunnel of claim 2, wherein the outer surface of said first element is spaced from and cooperates with the periphery of said cavity to define a bypass region for passage of circulating gas not diverted by said scoop surface.

4. The wind tunnel of claim 3, wherein the exhaust ends of said elements are spaced from the periphery of said cavity and define a mixing region in which the gas exiting said exhaust region joins the circulating gas received from said bypass region.

5. The wind tunnel of claim 4, wherein the outer surface of said second element is spaced from and cooperates with the periphery of said cavity to define a freestream recovery region disposed to receive circulating gas from said mixing region and to direct said circulating gas to said inlet and bypass regions.

6. The wind tunnel of claim 1, wherein each element is mounted for pivotal movement about a respective axis generally parallel to the axis of said cavity.

7. The wind tunnel of claim 6, including means for selectively moving each said element about its respective axis to selectively vary the opening of said nozzle.

8. The wind tunnel of claim 2, including means for selectively varying the size of said inlet region to control the amount of said circulating gas diverted into said nozzle.

9. The wind tunnel of claim 8, wherein said varying means includes means for mounting each said elements for pivotal movement about a respective axis parallel to the axis of said cavity and means for selectively moving each said element.

10. The wind tunnel of claim 1, wherein said rotor means comprises a cylindrical rotor and means for selectively rotating said rotor.

11. The wind tunnel of claim 10, wherein said rotating means comprises a magnet motor.

12. The wind tunnel of claim 10, also including a casing enclosing and rotatably supporting said rotor.

13. The wind tunnel of claim 12, wherein said casing includes a cylindrical core to which said rotor is coaxially connected, said rotor being mounted to said core for rotation about its axis.

14. The wind tunnel of claim 13, wherein said elements are moveably supported by said core, said elements being moveable about respective axes parallel to the axis of said core.

15. The wind tunnel of claim 1, further comprising gas feed and withdrawal means for selectively adding an additional amount of gas to the circulating gas.

16. A method for aerodynamically testing a surface in a test region at the center of a closed-loop periphery comprising the steps of:
   continuously circulating a gas about the interior periphery of the closed-loop;
   diverting a portion of the circulating gas through the test region; and
   returning the diverted gas to the periphery of the closed-loop.

17. A method as set forth in claim 16, further including the step of adding an additional amount of gas to the circulating gas.

* * * * *